(12) United States Patent
Kim et al.

(10) Patent No.: US 10,891,874 B2
(45) Date of Patent: Jan. 12, 2021

(54) ROBOT USING MULTI-COLOR CODE CARDS

(71) Applicant: Robomation Co., Ltd, Seoul (KR)

(72) Inventors: Kyoung Jin Kim, Seoul (KR); David Jason Zhu, Los Altos, CA (US); Jung Woo Kim, Seoul (KR)

(73) Assignee: ROBOMATION CO., LTD, Seoul (KR)

( * ) Notice: Subject to any disclaimer, the term of this patent is extended or adjusted under 35 U.S.C. 154(b) by 327 days.

(21) Appl. No.: 15/997,293

(22) Filed: Jun. 4, 2018

(65) Prior Publication Data

US 2018/0366026 A1  Dec. 20, 2018

(30) Foreign Application Priority Data

Jun. 14, 2017  (KR) .................. 10-2017-0075121

(51) Int. Cl.
  *G09B 19/00* (2006.01)
(52) U.S. Cl.
  CPC .................. *G09B 19/0053* (2013.01)
(58) Field of Classification Search
  CPC ......... A63H 17/32; A63H 17/40; G09B 19/00
  See application file for complete search history.

(56) References Cited

U.S. PATENT DOCUMENTS

| 7,097,532 B1 * | 8/2006 | Rolicki | A63H 17/28 446/175 |
| 8,747,182 B2 * | 6/2014 | Sofman | A63H 17/40 446/456 |
| 2018/0104609 A1 * | 4/2018 | Musliner | A63H 18/02 |

OTHER PUBLICATIONS

Kubo Coding, available online https://www.youtube.com/watch?v=bM9y4JB22NY, published Jan. 29, 2017. (Year: 2017).*

* cited by examiner

*Primary Examiner* — James S. McClellan
(74) *Attorney, Agent, or Firm* — Birch, Stewart, Kolasch & Birch, LLP

(57) ABSTRACT

A robot using multi-color code cards having a starting color portion, at least one of middle color portions, and a base color portion. The starting color portion indicates a start of each multi-color code card, the at least one of middle color portions has colors different from one another and from the color of the starting color portion, the base color portion has a color different from the starting color portion and different from the adjacent one of the middle color portions, codes corresponding to combined colors of the at least one of middle color portions and the base color portion are allotted, and when pushing the starting color portion below a single-color sensor, operations corresponding to the codes of combined colors of the at least one of middle color portions and the base color portion recognized by the robot are stored.

10 Claims, 11 Drawing Sheets
(10 of 11 Drawing Sheet(s) Filed in Color)

REPEAT GROUP

LOGIC GROUP

FUNCTION GROUP

ROBOT USING MULTI-COLOR CODE CARDS

CROSS REFERENCE TO RELATED APPLICATION

The present application claims priority to Korean Patent Application No. 10-2017-0075121, filed Jun. 14, 2017, the entire contents of which is incorporated herein by reference for all purposes.

BACKGROUND OF THE INVENTION

Field of the Invention

The present invention relates generally to a robot using multi-color code cards.

Description of the Related Art

As the importance of teaching computer coding in early education of children is being emphasized, teaching children coding of robots as shown in FIG. 1 has been in the limelight, and a variety of coding methods, for example, use of the coding cards to program a robot to move, have been developed.

However, in order to have a codable robot perform a motion as desired, a user must input a series of instructions of motion into the codable robot. An exemplary input method is to use single-color cards wherein the whole surface of each single-color card is printed with a single color corresponding to an instruction, as shown in FIG. 2.

The user pushes and pulls each single-color card in and out of a slot of a color sensor 10 in the bottom part of the codable robot one by one according to the sequence of motions the user desires. By repeating these operations, the codes for the operations corresponding to each single-color code are input into the codable robots.

However, in case of single-color cards whose whole surfaces are printed with single colors as shown in FIG. 2, the kinds of colors that can be used are limited, making it difficult to greatly increase the number of instructions. In addition, if the printed color of a single-color card is identical to the color of the bottom plate, an instruction (code) according to the bottom plate color, not the color of the single-color card, is recognized, whereby malfunction can occur.

In order to overcome these problems that the single-color cards of FIG. 2 have, multi-color sensors were installed at the bottom part of a codable robot and a multi-color card whose surface is printed with multiple colors as shown in FIG. 3 (FIG. 3 shows a multi-color card whose upper left side is printed in red and whose upper right side is printed in green) was used. In this case, use of the multi-color sensors increases the production costs as compared to use of the single-color sensor. In particular, like a credit card, a card insertion hole had to be installed, in order to distinguish the bottom plate color from the color of the multi-color card, and the color card had to be manufactured so that when the multi-color card is inserted through the card insertion hole, the position of each color sensor is aligned to detect each color region of the multi-color card (in FIG. 3, the red region in the upper left side and the green region in the upper right side). Accordingly, it was difficult to change the size or the shape of the card.

The foregoing is intended merely to aid in the understanding of the background of the present invention, and is not intended to mean that the present invention falls within the purview of the related art that is already known to those skilled in the art.

SUMMARY OF THE INVENTION

Accordingly, the present invention has been made keeping in mind the above problems occurring in the related art, and the present invention is intended to provide multi-color code cards that can greatly increase the number of codes in the robots using a single color sensor, and a robot that is capable of using multi-color code cards having various shapes and sizes.

In order to achieve the above object, according to one aspect of the present invention, there is provided a robot using multi-color code cards, wherein a starting color portion 11, at least one of middle color portions 12, 12-1, 12-2, 12-3 and a base color portion 13 are arranged adjacently to one another and consecutively in sequence on the surface of each multi-color code card; the starting color portion 11 indicates a start of each multi-color code card, and the same color is used with respect to all multi-color code cards; at least one of middle color portions 12, 12-1, 12-2, 12-3 has colors different from one another and different from the color of the starting color portion 11; the base color portion 13 has a color different from the starting color portion 11 and also different from the adjacent one of the middle color portions 12, 12-1, 12-2, 12-3; codes corresponding to combined colors of the at least one of middle color portions 12, 12-1, 12-2, 12-3 and the base color portion 13 are allotted; and when a user pushes the starting color portion 11 of each multi-color code card below a single-color sensor 10 on the bottom of the robot, operations corresponding to the codes of combined colors of the at least one of middle color portions 12, 12-1, 12-2, 12-3 and the base color portion 13 recognized by the robot are stored.

According to the present invention as described above, a single color sensor is used, which serves to reduce the production costs of a robot; multiple colors are used for one card, which serves to greatly increase the number of codes; and code values are determined on the basis of only the sequence of the colors printed on the color cards, which serves to provide multi-color code cards that can be used with various sizes and shapes for a robot, and a robot that uses the multi-color code cards.

BRIEF DESCRIPTION OF THE DRAWINGS

The patent or application file contains at least one color drawings. Copies of this patent or patent application publication with color drawings will be provided by the USPTO upon request and payment of the necessary fee.

The above and other objects, features and other advantages of the present invention will be more clearly understood from the following detailed description when taken in conjunction with the accompanying drawings, in which.

DETAILED DESCRIPTION OF THE INVENTION

Figure 1:
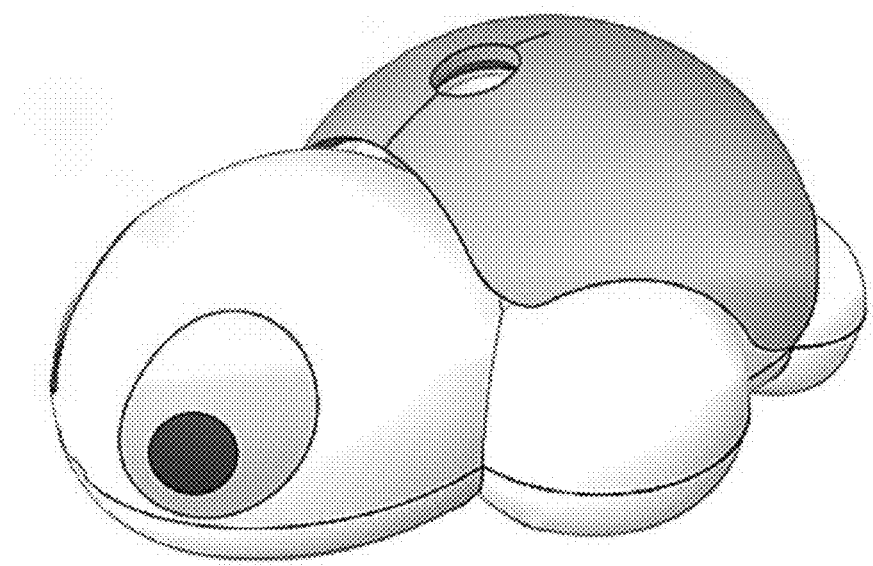
FIG. 1 shows a side perspective view and a bottom perspective view of a codable robot.
Figure 1:
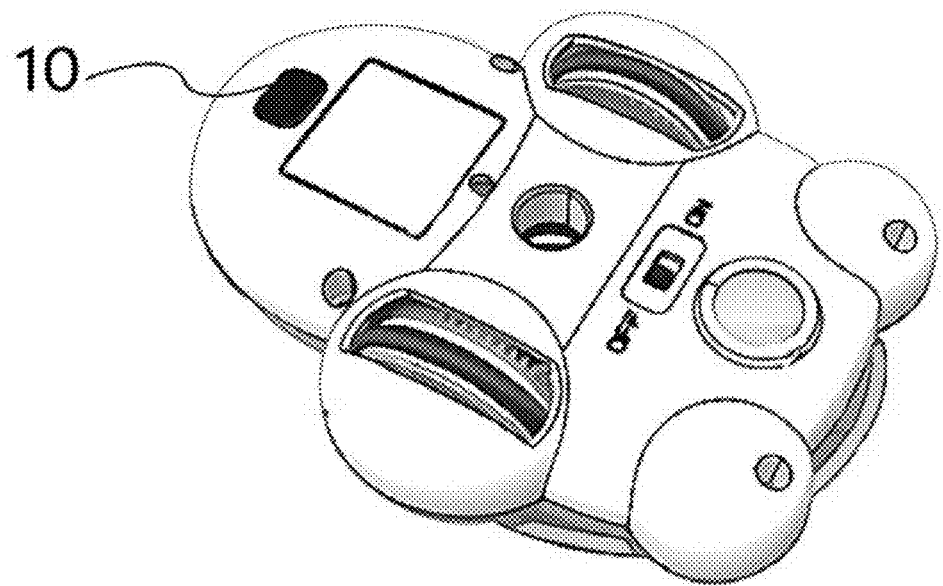
Figure 2:
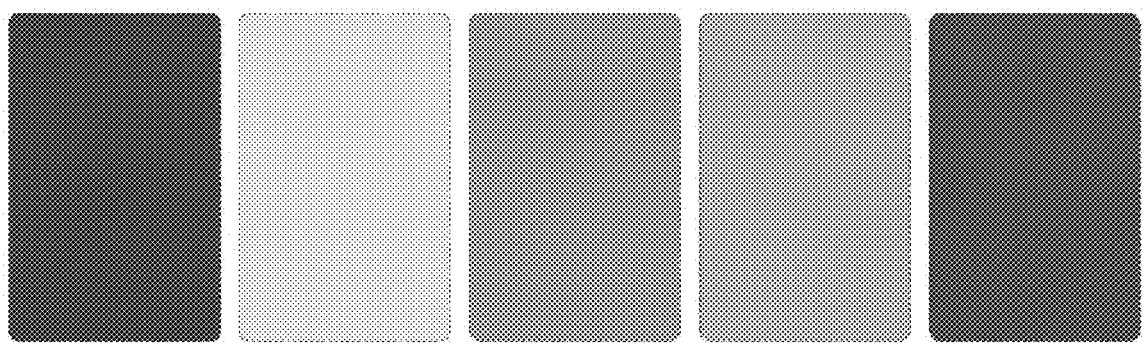
FIG. 2 shows a single color card according to a related art.
Figure 3:
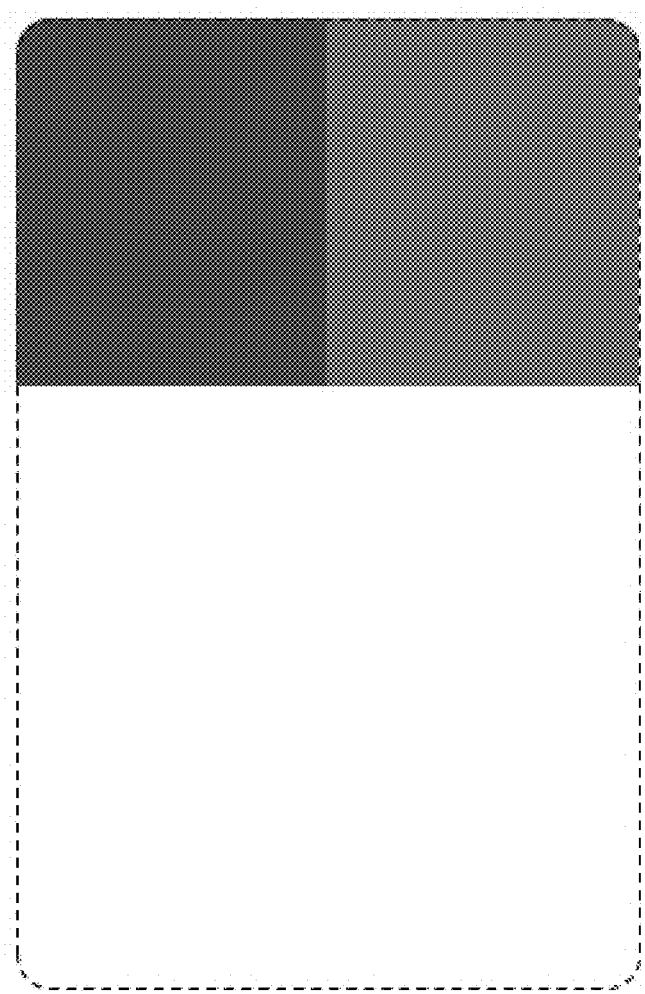
FIG. 3 shows a multi-color card according to another related art.

Hereinbelow, exemplary embodiments of the present invention will be described in detail with reference to the accompanying drawings. Throughout the drawings, the same reference numerals will refer to the same or like parts.

First, referring to FIG. 4, multi-color code cards for a codable robot according to the present invention (hereinafter referred to as "the multi-color cards") will be described in detail.

Figure 4:
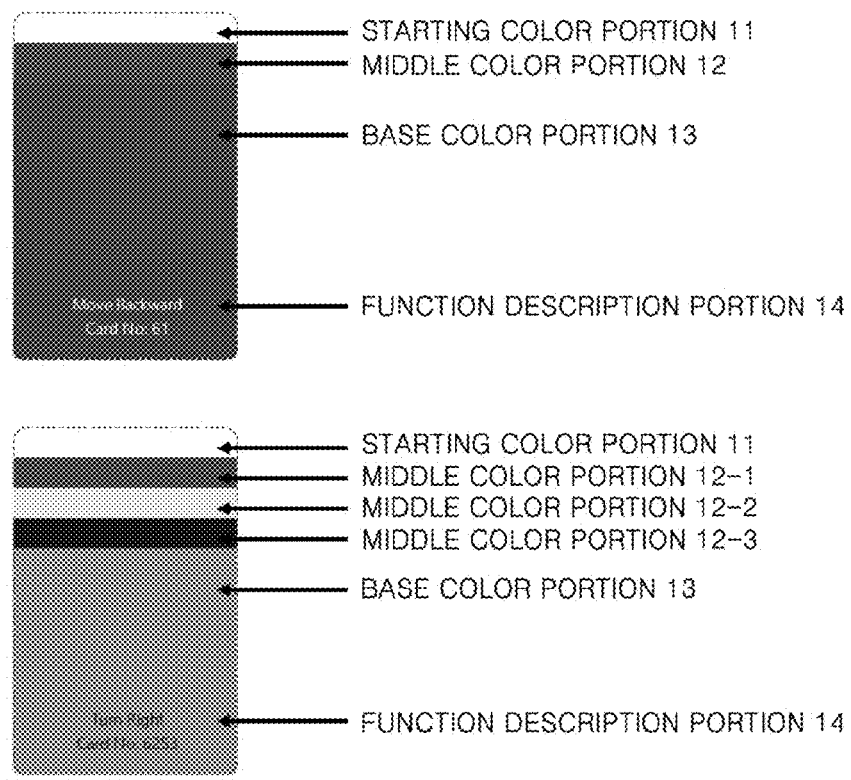
FIG. 4 shows a configuration of multi-color cards according to the present invention.
Figure 5:
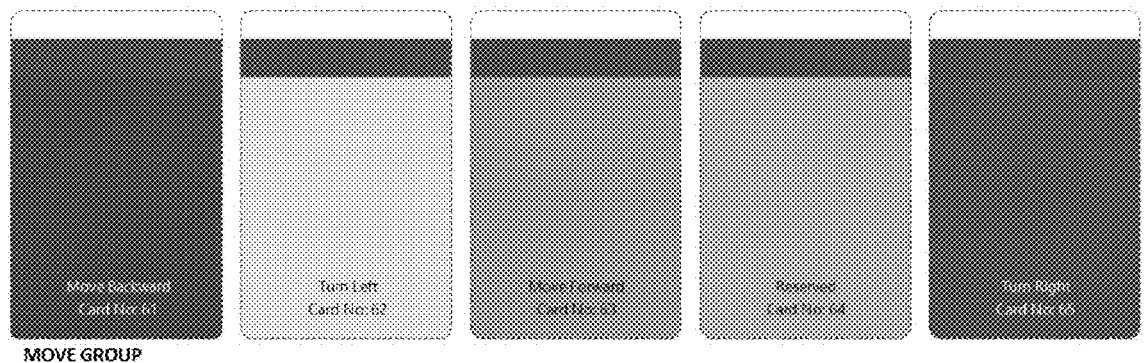
FIGS. 5 to 10 show multi-color cards by group among the multi-color cards according to the present invention.
Figure 6:
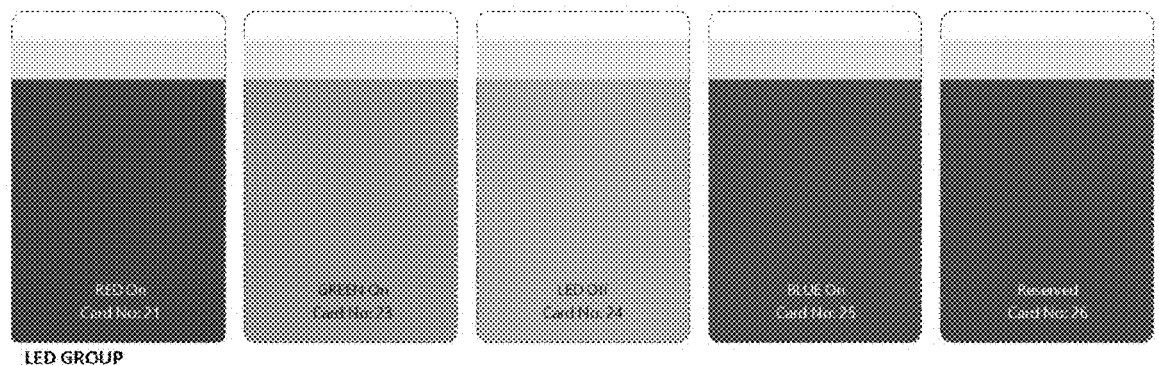
Figure 7:
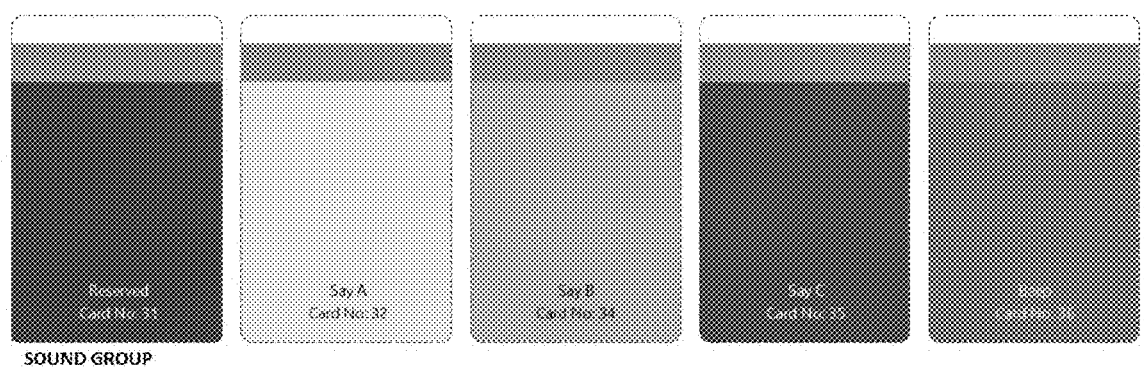
Figure 8:
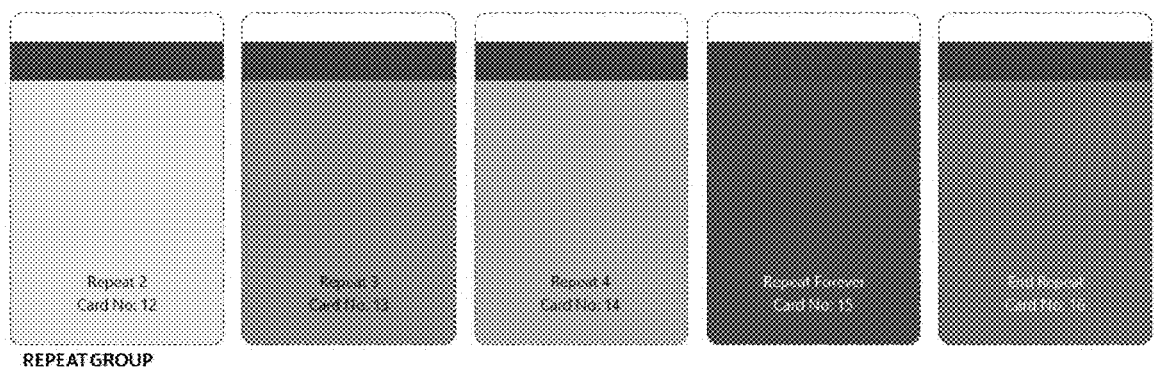
Figure 9:
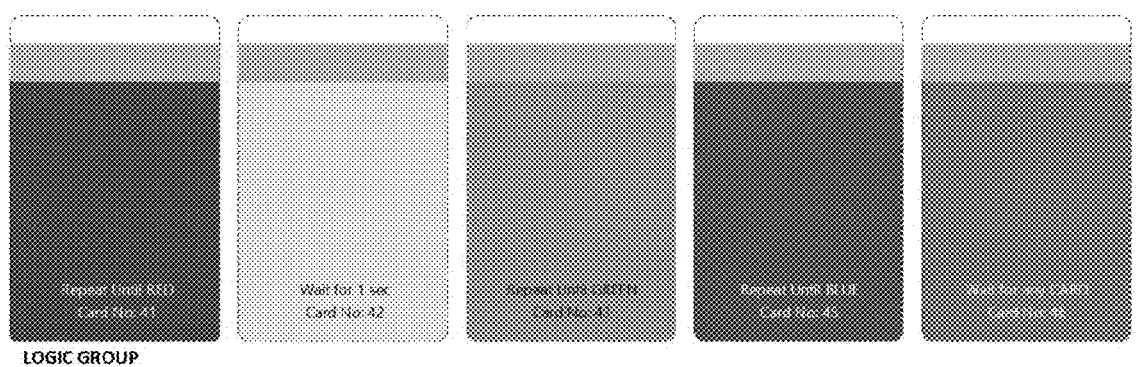
Figure 10:
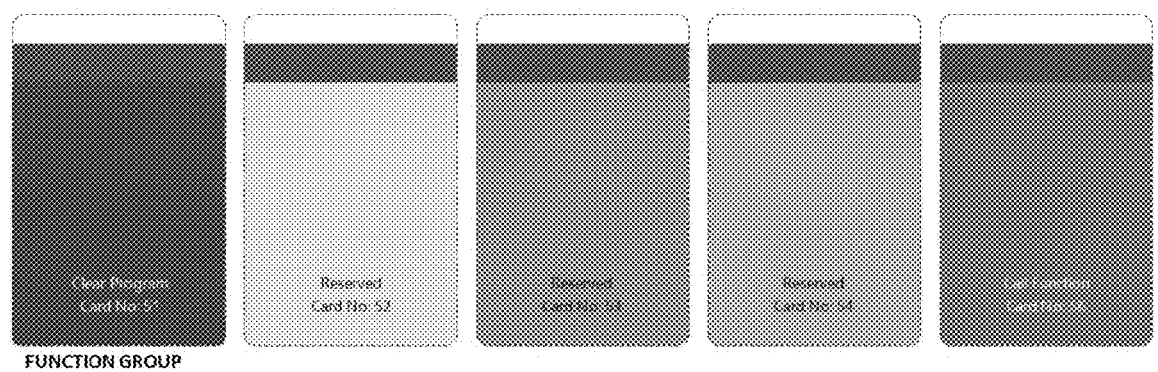

As illustrated in the upper part and the lower part of FIG. 4, a starting color portion 11, middle color portions 12, 12-1, 12-2, 12-3, and basically a base color portion 13 are sequentially printed on multi-color cards of the present invention, and function descriptions 14 to describe the function (code) of each multi-color card are added.

With respect to the middle color portions 12, 12-1, 12-2, 12-3, there may be one middle color portion 12 as shown in the upper figure of FIG. 4, or a plurality of middle color portions 12-1, 12-2, 12-3 as shown in the lower figure of FIG. 4 (the lower figure of FIG. 4 shows three middle color portions). At this time, as the starting color portion 11 indicates the starting portions of all the multi-color cards, the same color is used with respect to all the multi-color cards. A white color is available as shown in FIG. 4, or a black color or any other random color is also available. However, where any other colors than white and black are used, such a use may generate a problem that a mixed color portion recognized when the starting color portion 11 is mixed with the middle color portion 12 may appear, as will be described below, thus careful attention should be paid to the recognition.

In addition, different colors should be used for the starting color portion 11, the middle color portions 12, 12-1, 12-2, 12-3, and the base color portion 13.

In case of having a single middle color portion 12 as in the upper figure of FIG. 4, the multi-color cards may have the functions (codes) of [(the number of colors in the middle color portion)×(the number of colors in the base color)]. However, in case of having three middle color portions as in the lower figure of FIG. 4, the multi-color cards may have the functions (codes) of [(the number of colors in the first middle color portion)×(the number of colors in the second middle color portion)×(the number of colors in the third middle color portion)×(the number of colors in the base color)]. That is, as the number of the middle color portions increases, the functions (codes) that can be used also increases exponentially.

Also, as there are many cases that the functions are separated by group, the colors of the middle color portions 12 are designated in correspondence to the group names as shown in FIGS. 5 to 10. In this regard, if a method to determine colors of the base color portion 13 to correspond to the functions (codes) belonging to the group is used, multi-color cards having a hierarchical function structure can be formed. Here, FIG. 5 to 10 having one middle color portion 12 as in the upper figure of FIG. 4 illustrate 30 multi-color card sets belonging to six groups (Move Group, LED Group, Sound Group, Repeat Group, Logic Group, and Function Group) by using six colors.

Further, as a color sensor 10 recognizes the colors included in a specific area (for example, the area of 3 mm×3 mm) below the codable robot, mixed color portions including all two adjacent colors appear in the boundary portions of printed colors, and these mixed color portions are irrelevant to the codes, thus should be ignored. The ignoring method will be described in reference to FIG. 13.

Next, referring to FIGS. 11 to 13, changes in colors recognized when a multi-color card of the present invention having one middle color portion 12 is pushed in the color sensor 10 on the bottom of the codable robot and it is pulled out from the color sensor 10, and a method for outputting the middle color portion 12 and the base color portion 13, will be described below.

As shown in the left figure of FIG. 11, when a multi-color card according to the present invention wherein the starting color is white, the middle color is red, and the base color is green is pushed in between above the bottom plate (yellow) and below the codable robot, the color sensor recognizes the colors as same as shown in the right figure of FIG. 11 as time passes.

That is, signals appear on the color sensor 10 in the sequence of a yellow period ① of the bottom plate, a white period ② of the starting color portion, a red period ③ of the middle color portion, a yellow period ④ of the mixed color portion, and a green period ⑤ of the base color portion. Here, the mixed color portion in yellow appears by a combination of the middle color portion in red with the base color portion in green.

Figure 11:
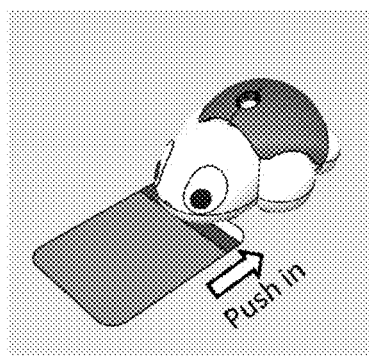
FIG. 11 shows changes in signals recognized when a multi-color card having two colors according to the present invention is pushed below a color sensor of the codable robot.
Figure 11:
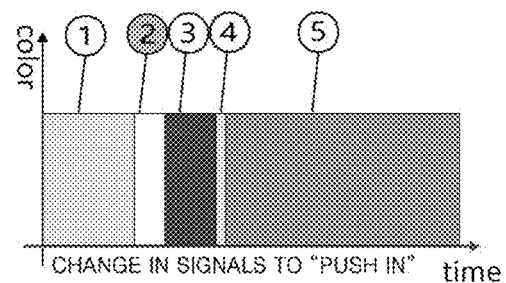
Figure 12:
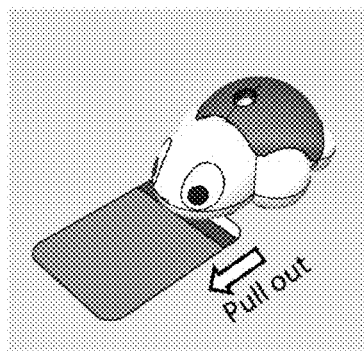
FIG. 12 shows changes in the signals recognized when a multi-color card having two colors according to the present invention is pulled out below the color sensor of the codable robot.
Figure 12:
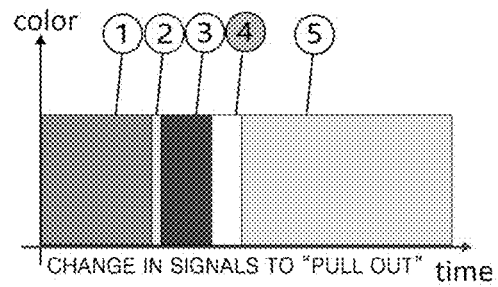
Figure 13:
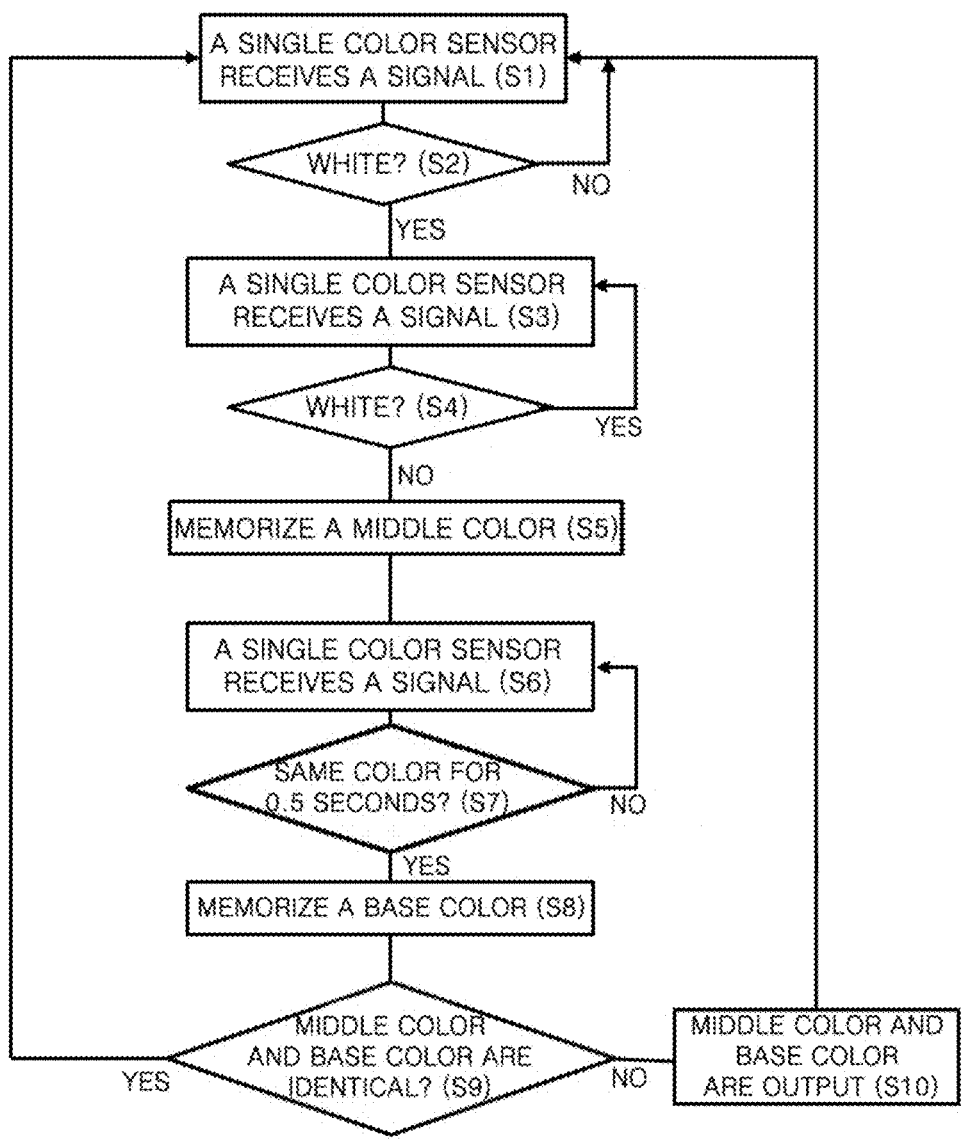
FIG. 13 is a flow chart showing a method of outputting a middle color and a base color when the multi-color card having two colors according to the present invention is pushed below the color sensor.

Likewise, when the multi-color card pulled out as in the left side of FIG. 11 is pulled out as in the left side of FIG. 12, the color sensor 10 recognizes the colors as same as in the right side of FIG. 12 as time passes.

That is, signals appear on the color sensor 10 in the sequence of a green period ① of the base color portion, a yellow period ② of the mixed color portion, a red period ③ of the middle color portion, a white period ④ of the starting color portion, and a yellow period ⑤ of the bottom plate, reversely to the sequence when the card is pushed in.

Here, as the width of the mixed color portion appearing when adjacent colors are mixed is very small as compared to the width of the middle color portion 12 or the base color portion 13, the yellow period ④ which is the mixed color portion when the card is pushed in and the yellow period ② which is the mixed color portion when the card is pulled out have very short periods as compared to the period during which the color of the middle color portion 12, the base color portion 13 or the bottom plate portion is recognized. However, they are illustrated with longer periods than the actual periods in the right figures of FIGS. 11 and 12, in order to explicitly indicate presence of periods to recognize the mixed colors.

Now, referring to the flow chart of FIG. 13, a method for outputting a middle color and a base color when the multi-color card in the upper part of FIG. 4 having one middle color portion 12 is pushed below the single color sensor 10 on the bottom of the codable robot will be described in detail.

If the codable robot is entered into a codable mode according to selection by the user, the single color sensor 10 on the bottom of the codable robot receives a color signal S1. Here, the color is recognized as the Red value, the Green value, or the Blue value output from the single color sensor.

In next step S2, it is determined whether the input color signal is the color of the starting portion indicating a start of the card, that is, white. Where the user has not yet pushed in the multi-color card according to the present invention below the single color sensor 10, the color recognized by the single color sensor 10 is yellow which is the bottom plate color, not the white of the starting color portion, whereby the codable robot returns to step S1. If these steps are repeated, the bottom color period ① of yellow appearing in the right feature of FIG. 11 is formed.

Now, if the user starts to push in the multi-color card below the single color sensor 10, the color recognized through the single color sensor 10 in step S2 starts to become the white of the staring color portion 11 indicating the start of the card, thus, the codable robot enters into next step S3, at which point the single color sensor 10 receives a color signal.

In next step S4, it is determined through the single color sensor 10 whether the input color signal is white of the starting color portion 11. Where the starting color portion 11 of the multi-color card has not completely passed through the bottom of the single color sensor 10, the color recognized through the single color sensor 10 is still white, thus the codable robot returns to step S3. If these steps are repeated, the starting color period ② of white appearing in the right feature of FIG. 11 is formed.

Now, when the starting portion of the multi-color card has passed by the bottom of the single color sensor 10, the color recognized through the single color sensor 10 in step S3 will become red of the middle color portion 12, not white. Accordingly, the single-color sensor 10 memorizes the red color which is the middle color in step S5. The color recognized at the single color sensor 10 is red until the mixed color portion is reached, thus the middle color period ③ of red shown in the right figure of FIG. 11 is formed.

In next step S6, a color signal is received through the single color sensor 10. If the input color enters into the yellow color period (mixed color period) which is formed by mixture of the middle color portion in red with the base color portion in green, the mixed color period ④ of yellow as shown in right figure of FIG. 11 starts to be formed.

The mixed color portion of yellow is formed when the single color sensor 10 detects both the red and green colors together when the card being pushed in. This time period is relatively very short, for example, less than 0.5 seconds, when compared to the time the single color sensor 10 detects the starting color portion 11, or the middle color portion 12, or the base color portion 13 in the multi-color card.

Accordingly, it can be deemed that where the color recognized through the single color sensor 10 after passing through step S6 remains unchanged under the same color for less than 0.5 seconds which is determined to be the mixed color period ④, the card is at the mixed color period ④, and where the same color is maintained for 0.5 seconds or more, the card is clearly entered into the base color period ⑤.

It is determined whether the same color is maintained for 0.5 seconds or more at step S7. Where the same color is maintained only for less than 0.5 seconds (the mixed color period), the codable robot returns to step S6 at which a color signal is received through the single color sensor 10, and enters into step S7. Where the same color is maintained for 0.5 seconds or more (the card enters into the base color period), the input color is memorized as the base color S8.

By doing so, the color of the mixed color period (mixed color portion) is disregarded, and only the colors of the middle color portion and the base color portion are memorized.

Where the colors of the middle color portion 12 and the base color portion 13 are printed mistakenly with the same color (for example, both are printed in red), red is memorized as the middle color in step S5. As the red color is maintained for 0.5 seconds in step S7, red is recognized as the base color in step S8. This causes a problem that the middle color and the base color becomes identical. As this situation should be disregarded in step S9, where the middle color and the base color are identical, these colors are disregarded and outputting is not performed, thus the codable robot returns to step S1. Where the colors are different, the middle color and the base color are both output S10.

At this time, where the middle color and the base color are both output in step S10, it is considered that multi-color card is correctly recognized. In this regard, it is desirable that a beep sound is generated or light of a specific color is emitted, so that the user can easily know by the sound or light that the multi-color card is pushed in and correctly recognized.

When the multi-color card according to the present invention is pulled out of the single color sensor 10 on the bottom of the codable robot after pushing in, changes in recognized colors occur as in the right side of FIG. 12 reversely to the sequence when the card is pushed in. If the flow chart of FIG. 13 is applied in the same manner as pushing in the card, the green period ① of the base color portion, the yellow period ② of the mixed color portion, and the red period ③ of the middle color portion are disregarded until before white of the starting color period ④ by step S1 and step S2 appears. If the card enters into the white period ④ of the starting color portion, the codable robot proceeds to step S3. If it is confirmed in step S4 that the card passes through the white period ④ of the starting color portion, yellow color of the bottom plate is memorized as the middle color in step S5, and yellow of the bottom plate appears for 0.5 seconds in step S7, thus yellow is memorized as the base color in step S8. As a result of determination in step S9, as the middle color and the base color are identical in color (yellow), the codable robot does not proceed to step S10. Accordingly, as the middle color and the base color of yellow are not output and the codable robot returns to step S1, the middle color and the base color are disregarded.

As a consequence, when the card is pulled out, the codable robot does not proceed to step S10, and neither a beep sound nor a light emission is generated. Accordingly, the user can recognize a beep sound or emitted light of a specific color only when a normal multi-color card is pushed in and correctly recognized.

A case where the middle color portion 12 consists of one color in FIGS. 11 and 12 has been described. However, a multi-color card having two or more middle color portions may be used. In this regard, a four-color card having three middle color portions is shown in the lower part of FIG. 4, and FIGS. 14 and 15 show changes in colors recognized when a five-color card having four middle color portions is pushed in below the color sensor 10 of the codable robot and it is pulled out thereof.

Figure 14:
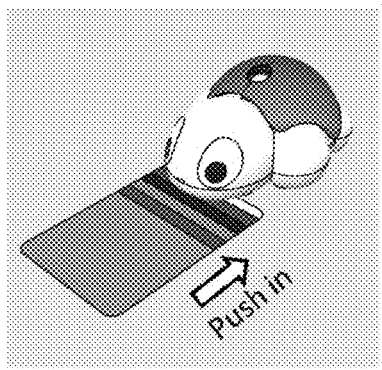
FIG. 14 shows changes in signals recognized when a multi-color card having five colors according to the present invention is pushed below the color sensor.
Figure 14:
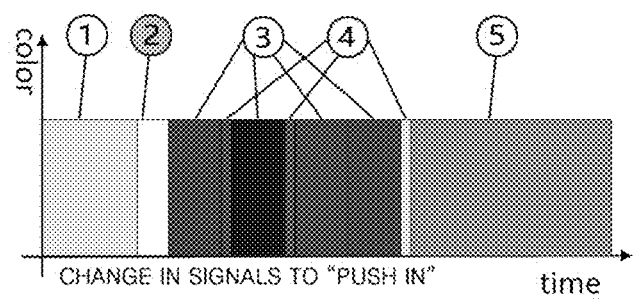
Figure 15:
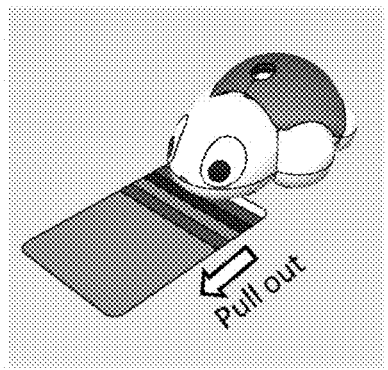
FIG. 15 shows changes in signals recognized when the multi-color card having five colors according to the present invention is pulled out below the color sensor.
Figure 15:
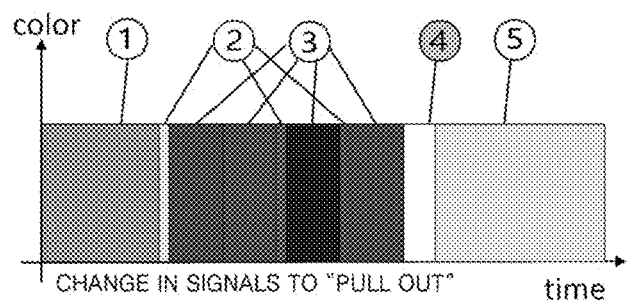

For example, in case of the five-color card having four middle color portions, as shown in FIG. 14, after steps S3 to S5 to memorize the first middle color portion are performed, all input colors are memorized through step S6, thereafter a color set in sequence of four middle colors and one base color is deduced if the mixed color period whose maintenance time is short, for examples, less than 0.2 seconds, is removed. It is determined whether each color of the color set in this sequence is identical to a next color. If once a case that the colors are same occurs, the color set in this sequence is disregarded. If the colors are not identical, a method for outputting the color set (combination) can be applied to every case where the card is pushed in and pulled out.

As described above, as a single color sensor is used according to the present invention, the production cost of a robot becomes lowered.

Also, even where the single color sensor is used according to the present invention, the starting color portion indicates a starting portion of the card, and as many codes are formed as the number of combinations in sequence of the middle color portion(s) and the base color portion printed after the starting color portion. Accordingly, it does not matter even if the bottom plate color is identical to the middle color portion or the base color portion.

Figure 16:
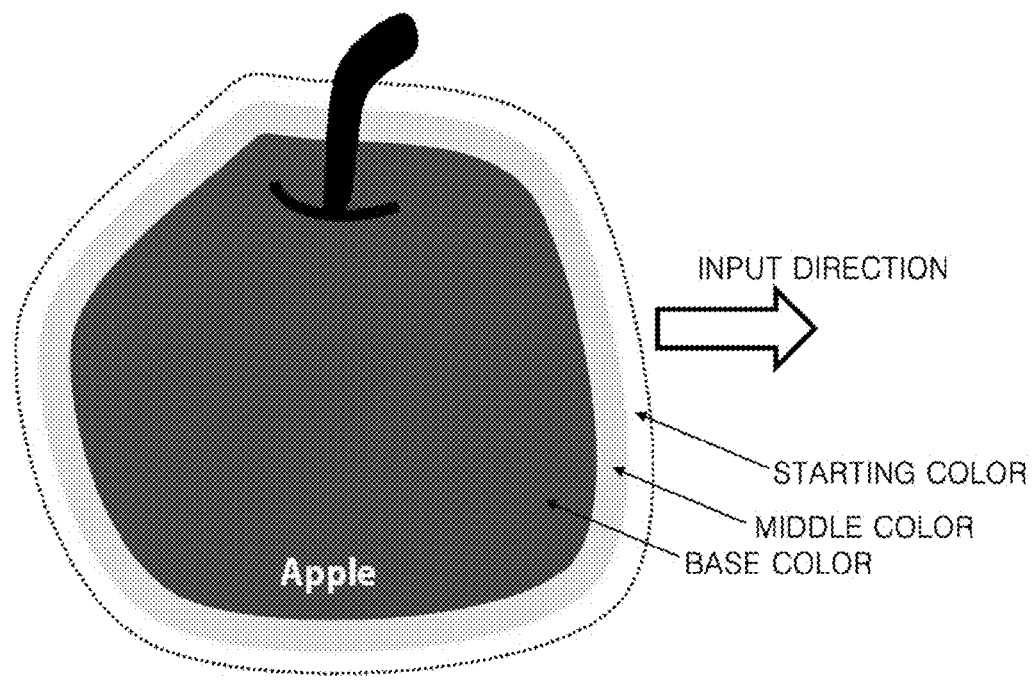
FIG. 16 shows an apple-shaped multi-color card that can be used in the present invention.

Even though the single color sensor is used, as a plurality of middle color portions can be contained in the color card, the number of codes can be drastically increased because the codes are formed as the number of combined colors in sequence drastically increases.

Where a multi-color sensor is used as in the conventional art, the multi-color cards should have been manufactured in their sizes and shapes depending upon the position of the multi-color sensor. However, according to the present invention, a single color sensor is used and code values are determined only based on the sequence of colors recognized when the multi-color card is pushed in or pulled out of the single color sensor. According to this, as the code values are determined only based on the sequence of the colors printed on the multi-color card, it is possible to manufacture and use the multi-color cards in various sizes and shapes (for example, an apple-shaped multi-color code shown in FIG. 16).

Although preferred embodiments of the present invention have been described for illustrative purposes, those skilled in the art will appreciate that various modifications, additions and substitutions are possible, without departing from the scope and spirit of the invention as disclosed in the accompanying claims.

For example, a case where the bottom plate color is yellow has been described. However, if the bottom color is white, as same as the starting color portion, the white color continuously appears at first when the card is pushed in, thus two starting colors appear. Even when the card is pulling out, the white color appears twice in the last. However, as there is no problem since the middle color(s) and the base color are determined by the colors (excluding mixed colors) of the designated number appearing after white, it does not matter even if the bottom plate color and the starting color are white in common.

It has been described that the multi-color card according to the present invention is manufactured in the form of a card printed with a middle color portion and a base color portion, being capable of being instantly used. However, it is also possible to arrange the cards printed with a middle color portion and a base color portion to be separable along perforations in printed media such as paper, to allow the user to use each card by separating the cards from the printed media for example, along cut dots.

Also, it has been described that colors of the middle color portion and the base color portion of the multi-color card are printed. However, it is possible to form them by a variety of methods, for example, coloring by color pens.

What is claimed is:

1. A robot using multi-color code cards, wherein a starting color portion, at least one of middle color portions, and a base color portion are arranged adjacently to one another and consecutively in sequence on the surface of each multi-color code card;
   the starting color portion indicates a start of each multi-color code card, and the same color is used with respect to all multi-color code cards;
   at least one of middle color portions has colors different from one another and also different from the color of the starting color portion;
   the base color portion has a color different from the starting color portion and also different from the adjacent one of the middle color portions;
   codes corresponding to combined colors of the at least one of middle color portions and the base color portion are allotted; and
   when a user pushes the starting color portion of each multi-color code card below a single-color sensor on the bottom of the robot, operations corresponding to the codes of combined colors of the at least one of middle color portions and the base color portion recognized by the robot are stored.

2. The robot using multi-color code cards according to claim 1, wherein the multi-color code cards comprise one middle color portion.

3. The robot using multi-color code cards according to claim 1, wherein the multi-color code cards comprise a plurality of middle color portions.

4. The robot using multi-color code cards according to claim 1, wherein colors of middle color portions represent specific groups of the multi-color code cards.

5. The robot using multi-color code cards according to claim 4, wherein the color of the base color portion represents a specific function belonging to one of the specific groups.

6. The robot using multi-color code cards according to claim 5, wherein the base color portion further includes a function description portion.

7. The robot using multi-color code cards according to claim 1, wherein the robot is a codable robot.

8. A method for operating a robot using multi-color code cards, the method comprising:
   recognizing, by a single color sensor on the bottom of the robot, a color of a starting color portion that is arranged on each multi-color code card, and indicates the start of the multi-color code card whose color is the same with respect to all the multi-color code cards;
   recognizing, by the single color sensor, colors of middle color portions that are arranged adjacent to the starting color portion, where two adjacent middle color portions has different colors from each other and the middle color portion that is adjacent to the starting color portion has different color from the starting color portion;
   recognizing, by the single color sensor, a color of the base color portion that is arranged adjacent to the middle color portions, and is different from the colors of the starting color portion and from the adjacent middle color portions;

allotting codes corresponding to combined colors of the at least one of middle color portions and the base color portion; and when a user pushes the starting color portion of each multi-color code card below a single-color sensor on the bottom of the robot, storing operations corresponding to the codes of combined colors of the at least one of middle color portions and the base color portion recognized by the robot.

9. The method for operating a robot using multi-color code cards according to claim 8, wherein the robot is a codable robot.

10. The method for operating a robot using multi-color code cards according to claim 8, wherein when a combined color of the at least one of middle color portions and the base color portion is correctly recognized, the codable robot generates a specific sound or emits light of a specific color.

* * * * *